Aug. 13, 1940.   K. A. WESTON   2,211,186
MATERIAL WORKING MACHINE
Filed Feb. 18, 1939   2 Sheets-Sheet 1
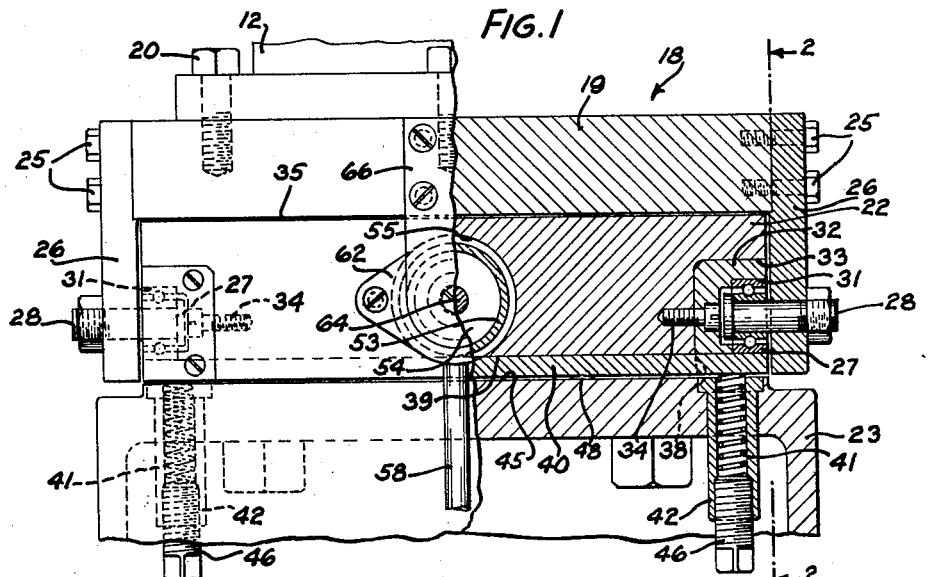
INVENTOR
K. A. WESTON
BY Emery Robinson
ATTORNEY

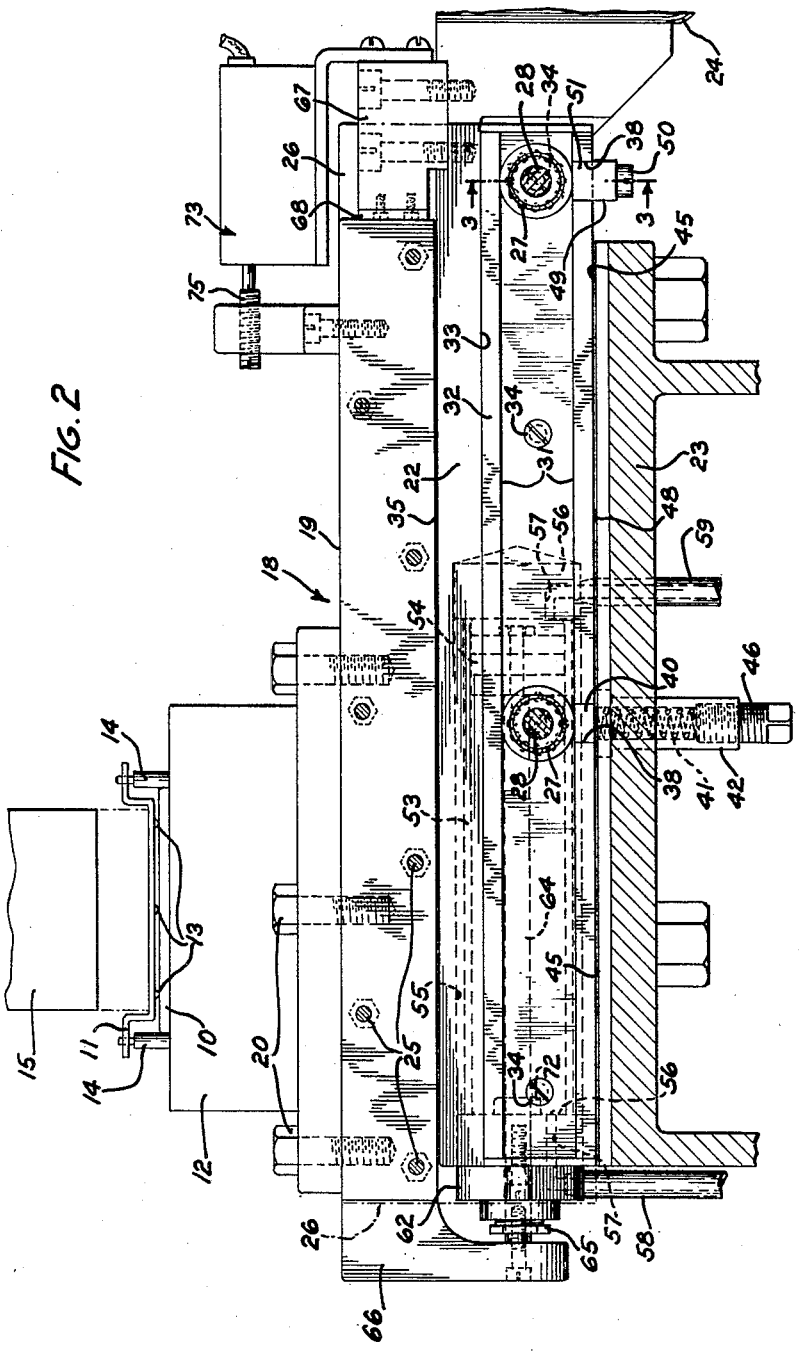

Patented Aug. 13, 1940

2,211,186

UNITED STATES PATENT OFFICE 2,211,186

MATERIAL WORKING MACHINE

Keith A. Weston, Chicago, Ill., assignor to Western Electric Company, Incorporated, New York, N. Y., a corporation of New York Application February 18, 1939, Serial No. 257,183

9 Claims. (Cl. 219—4)

This invention relates to material working machines, and more particularly to movable work supporting devices for such machines.

In the operation of certain types of punch presses, welding machines and the like, it is necessary to feed material between dies or electrodes and to remove the completed parts therefrom. This can be done by hand, but that practice is sometimes objectionable due to the prospective injury hazard. In some cases the material and parts can be handled safely with pliers but in some machines, such as projection welders wherein a plurality of materials must be positioned and aligned accurately, the use of pliers is not always satisfactory. In some cases pliers could be used except that limited electrode or die movement prevents their use.

One object of this invention is to provide a simple and practicable movable work supporting, feeding and withdrawing device for material working machines.

Another object of this invention is to provide such a device for material working machines which, upon movement from a work loading position to a position where the work is to be operated upon effects an operating cycle of the machine and, thereafter, a return of the device to its work unloading and loading position.

A further object of this invention is to provide a movable work supporting, feeding and withdrawing device for welding machines wherein a positive electrical contact is made between movable and fixed portions thereof for the passing of the welding current.

In accordance with the above objects, the invention in accordance with one embodiment thereof as applied to a press type projection welding machine contemplates a work supporting roller type carriage or movable electrode platen riding on spaced rails carried in a stationary electrode platen arranged therebelow, the stationary and movable platens being slightly spaced apart between upper and lower faces thereof at all times except when pressure is applied to the movable platen by an upper movable ram electrode to allow free movement of the movable platen to and from the welding position. The lower sides of the rails have portions removed which are replaced by yieldable elements onto which the rollers ride so that when the movable platen and work thereon is subjected to the pressure of the upper ram electrode, the former platen will move downwardly into engagement with the stationary electrode platen and close up the slight clearance space therebetween. This provides an extended contact surface for the welding current, otherwise the only path for the current would be through the rollers, which is insufficient in some cases for welding purposes and, furthermore, the rollers would have to withstand the ram pressure and this would not be practicable for most work. An advance movement of the electrode platen to position it below the movable electrode and ram is effected by the manual closing of an electric circuit which energizes a solenoid which in turn actuates a valve for supplying air pressure to a cylinder and piston operatively connected to the platen. This movement of the platen closes an electric circuit which initiates and completes the welding cycle of the upper ram electrode and after the welding circuit is broken a second solenoid is energized to actuate the air valve and the platen is retracted.

Other objects and advantages of this invention will more clearly appear from the following detailed description, taken in connection with the accompanying drawings, in which Fig. 1 is a fragmentary front elevation, partly in section, of a welding machine embodying the features of the invention, the work supporting, feeding and withdrawing carriage being shown in an advanced position just before the welding operation;

Fig. 2 is a longitudinal vertical section taken on the line 2—2 of Fig. 1 showing fragmentarily the upper movable electrode about to descend and complete the welding operation;

Fig. 3 is a fragmentary vertical sectional detail view taken on the line 3—3 of Fig. 2, and Fig. 4 is a diagrammatic representation of a welding machine and its control circuit embodying the features of this invention.

In the accompanying drawings, referring particularly to Fig. 2, one embodiment of this invention is illustrated as used in connection with a welding machine for effecting projection type welding of parts. The machine in general is of a well known type and certain details of construction and operating elements thereof have been omitted from the present disclosure since they are not essential to a complete understanding of this invention.

It will be sufficient herein, it is believed, to state that in the operation of the machine of the type mentioned, a part 10 which is to be electrically welded to a part 11 is mounted upon a support 12 which serves as a portion of a lower electrode which is stationary during the welding operation except for a slight downward movement to be referred to hereinafter. The part 11 is formed with a plurality of embossed projections 13 which abut the surface of the part 10 and provide welding areas at which the two parts are to be joined. Suitable means indicated at 14 serve to predeterminedly position the parts 10 and 11 relative to each other and hold them in position on the electrode 12. An upper reciprocatory ram electrode 15 of the machine is fragmentarily illustrated in Fig. 2 which in the welding cycle is moved in opposite directions along a fixed line, a downward movement to engage and exert pressure upon the parts during the welding thereof and, thereafter, a movement back to its upper position, as shown. A flexible conductor 16 (Fig. 4) forming part of a welding circuit is connected to the electrode 15. The movement of the electrode 15 may be effected by any suitable well known type of actuator employed for this purpose, such as, for instance, a toggle mechanism. Such means is not disclosed herein since it is not believed necessary to a full understanding of the invention.

A work supporting carriage, indicated generally by the numeral 18 is provided for supporting and moving the assembled parts 10 and 11 from a position shown at the left of the upper reciprocatory electrode 15, as viewed in Fig. 4, during the loading of the parts, to a welding position directly under the electrode 15, as shown in Fig. 2. The carriage 18 comprises a copper platen 19 to the upper face of which is attached, by a plurality of screws 20, the support 12 carrying the parts 10 and 11 to be welded together. Directly below the platen 19 is a stationary copper platen 22 or lower electrode which is fixed to a frame 23 of the machine. A flexible conductor 24 (Figs. 2 and 4) forming part of the welding circuit is connected to the lower electrode platen 22. Attached by screws 25 to and extending along opposite sides of the platen 19 are depending stainless steel plates 26 each carrying at their lower ends two spaced ball bearing rollers 27 supported by shafts 28 fixed to the plates. Each set of rollers 27 ride upon opposed upper and lower surfaces 31 of U-shaped stainless steel rails 32 set in longitudinal recesses 33 formed in the bottom face of the stationary platen 22 along opposite sides thereof, the rails being fixed in position by screws 34. The plates 26 and rails 32 are preferably made of some non-magnetic material, such as stainless steel for reducing the reactance of the secondary circuit of the machine.

In the movement of the carriage 18 from its work loading and unloading position to a position where the parts 10 and 11 will be under the upper electrode 15 and back to its work loading and unloading position, it is desirable that its movement be free with a minimum of friction. In addition to this requirement it is essential that an extended and excellent contact surface be provided for the welding current from the lower electrode platen 22 and through the carriage platen 19 which carries the work support 12 serving as a part of the lower electrode, during the welding cycle. Such an extended and excellent contact surface can not be provided by the rollers 27. To permit the carriage 18 to freely move a suitable clearance space 35 (Figs. 1 and 2) is provided between the adjacent upper and lower parallel faces of the platens 22 and 19, respectively, at all times except when the upper electrode 15 is exerting pressure upon the parts 10 and 11 during the welding cycle. During this period the carriage platen 19 moves downwardly and is supported solely upon the upper face of the stationary platen 22, the clearance space 35 being closed up. To permit this movement of the carriage 18 the following structure and arrangement is provided.

Each of the rails 32 is cut away along its lower portion at two spaced points (Fig. 2) to provide recesses 38, the recesses in one rail being directly aligned with the recesses in the opposite rail. Formed in the platen 22 is a recess 39 extending across its width and aligned with the pair of recesses 38 in the rails 32 which are nearest the left end of the carriage 18 as viewed in Fig. 2, the recess 39 being indicated in Fig. 1. Freely fitted in the aligned recesses 38 and 39 is a continuous bar or pad 40 extending across the platen 22 and replacing the portions of the rails which were removed in forming the recesses 38. The pad 40, adjacent each end, and viewed in Fig. 1, is supported by adjustable compression springs 41 carried in shouldered sleeves 42 entered in shouldered apertures provided in an upper face 45 of the frame 23, the compression of the springs being adjusted by screws 46 threaded into the lower ends of the sleeves and engaging the springs. In all positions of the carriage 18 and except when it is being subjected to the downward pressure of the upper electrode 15, the compression of the springs 41 is sufficient to hold the pad 40 in engagement with an upper horizontal wall of the recess 39. As shown in Figs. 1 and 2 wherein the carriage 18 is in its advanced position with the work under the electrode 15, the rollers 27 are resting upon the upper spaced faces of the pad 40 which are in alignment with the lower faces 31 of the rails 32. It will also be noted that the lower face of the pad 40 is spaced slightly above the adjacent parallel face of the frame 23, as indicated at 48, so that when the clearance space 35 between the adjacent parallel faces of the platens 22 and 19 is closed up during the welding operation the pad will be free to move downwardly. Preferably the space 48 should be slightly greater than the space 35.

At the right end of the carriage 18 (Figs. 2 and 3) the rollers 27 are shown supported on opposite yieldable ends of a steel bar 49 which is attached intermediate its ends by a screw 50 to the bottom face of the platen 22. The opposite ends of the bar 49 have raised portions 51 which fit in the recesses 38 of the rails 32, the upper faces of the portions 51 being normally aligned with the lower faces 31 of the rails upon which the rollers 27 ride. During the welding operation the end portions 51 of the bar 49 upon which the rollers 27 are supported are flexed downwardly about the attaching screw 50, as indicated in broken outline in Fig. 3, as the clearance space 35 is closed up. The action and function of the bar 49 is similar to that of the pad 40 and associated springs 41 at the opposite end of the carriage. Thus when the parts 10 and 11 are subjected to the pressure of the upper reciprocatory electrode 15 the copper platen 19 of the carriage 18 will move downwardly into engagement with the stationary copper electrode platen 22, closing up the clearance space 35 therebetween and providing an excellent and extended contact surface for the welding current.

For moving the carriage 18 in feeding work to the welding position and withdrawing the work after welding there is provided a fluid pressure motor or actuating device comprising a cylinder 53 and piston 54 mounted in a recess 55 formed in the stationary platen 22 intermediate the rails 32. The ends of the cylinder 53 are provided with heads 56 formed with channels 57 which are connected at their outer ends with pipes 58 and 59 and at their inner ends with the interior of the cylinder at opposite sides of the piston 54. A flange 62 formed upon the outer cylinder head 56 and attached to the forward end face of the platen 22, as viewed in Fig. 1 retains the cylinder 53 in the recess 55. A piston rod 64 extends through a suitable stuffing gland 65 carried in the flange 62, the rod being attached to an arm 66 fixed to and depending from the forward end face of the carriage platen 19. A bar 67 fixed to the upper face of the stationary platen 22 serves as a stop member for the carriage 18 in its advanced position wherein the work is in position under the upper reciprocatory electrode 15 ready for welding. The bar 67 carries a vertical fibre facing member 68 against which the vertical inner end face of the carriage platen 19 abuts in stopping. The fibre facing member 68 also serves to prevent welding currents from flowing through the stop bar 67 to the platen 19. In moving outward to the position shown in Fig. 4 the piston 54 engages a stop face 72 formed on the head 56 at the left end of the cylinder, as viewed in Fig. 1.

Carried by the stop bar 67 is a push button two point make type electrical circuit switch 73 which is effective to normally hold open a motor circuit for actuating the electrode 15 through an operating and welding cycle. The switch 73 is actuated to close the circuit when the carriage 18 reaches its advanced position (Fig. 2) with the work predeterminedly positioned under the upper reciprocatory electrode 15 by an aligned adjustable screw 75 or switch actuator mounted on the carriage 18 moving into actuating relation with the switch. The function of the switch 73 will be referred to in describing the operation of the welding machine in connection with Fig. 4.

As shown in Fig. 4 alternate ends of the air cylinder 53 and piston 54 for actuating the carriage 18 are supplied with compressed air by the pipes 58 and 59, the supply and exhaust being controlled by an ordinary four-way valve 78 which is actuated by an arm 79. The valve 78, as shown, is of the rotary plug type having two passages therein adapted to connect alternate ends of the cylinder 53 by way of the pipes 58 and 59, either with a suitable source of compressed air supply (not shown) connected to a pipe 80, or an exhaust pipe 81. When the valve 78 is in the position shown in Fig. 4 the right end of the cylinder 53 is connected by the pipe 59 and one valve passage to supply pipe 80 and the piston 54 is thus forced to its left hand position, as shown, and carries with it through the connections previously described the carriage 18. During this movement of the piston 54 the pipe 58 at the other side of the piston is connected to the exhaust pipe 81 through the other valve passage. To move the piston 54 towards the right to position the work mounted on the carriage 18, as shown in Fig. 2, in alignment with the upper reciprocatory electrode 15, the valve 78 is rotated in a clockwise direction 90°, by means to be presently described, which simultaneously connects the supply pipe 80 with the left end of the cylinder 53 and the right end thereof with the exhaust pipe 81.

To cause the valve 78 to move to the last mentioned position, the operator closes a solenoid circuit connected to main conductors 84 and 85, which are supplied from a suitable source of alternating current (not shown). The solenoid circuit is closed by actuating a pair of spaced hand push button two point make switches 86, two switches being included in the circuit to insure that the operator will have to use both hands, thus insuring that his hands will not be injured by moving parts of the machine. By actuating the switches 86, a solenoid 87 is energized and a core 88 thereof moves to the left. Attached to the core 88 is an arm 89 which is pivotally connected to the outer end of the valve arm 79. The arrangement is such that as the core 88 moves toward the left the valve 78 will be rotated 90° to connect the air supply pipe 80 with the left end of the cylinder 53 and the carriage is thus advanced to the position shown in Fig. 2. Effective to move the core 88 to the right is a second solenoid 92, also connected to the conductors 84 and 85. The solenoid 92 is energized at a predetermined period in the operation of the machine, at which time the solenoid 87 is not energized, to cause the carriage 18 to return to its work loading and unloading position, as shown in Fig. 4.

Movement of the carriage 18 to the position shown in Fig. 2 closes the switch 73 to complete a circuit to a motor 93 from the main conductors 84 and 85. The motor 93 operates the upper reciprocatory electrode 15 through a complete operating and welding cycle through a suitable drive mechanism including a crank shaft and operatively connected toggle mechanism (not shown).

Any usual or suitable mechanism, such as a cam actuated switch, indicated in general at 94 carried upon the frame 23, and suitably driven during the operating cycle of the crank shaft (not shown) of the welding machine may be employed for controlling the timing of the current supply from the main conductors 84 and 85 by way of conductors 95 and 96 to the primary winding of a transformer 100. The current to the flexible conductors 16 and 24 connected to the electrodes 15 and 22, respectively, is thus cut on or off at correct intervals during operation, the primary circuit being closed immediately after the electrode 15 has contacted the work and cut off at the termination of the welding period and before the electrode 15 moves upwardly. The switch 94 also controls by way of conductors 101 and 102, the solenoid 92, the conductors being connected to the main conductors 84 and 85. The circuit through the conductors 101 and 102 is closed by the switch 94 to energize the solenoid 92 after the electrode 15 starts its upward movement. The circuit to the motor 93 is connected by way of conductors 103 and 104 to the main conductors 84 and 85. Thus when the switch 73 is operated by the actuator 75 carried by the carriage 18 the circuit through the switch 94 is closed and the welding machine begins its operating cycle. Upon the carriage 18 being retracted the motor circuit is opened by the actuator 75 moving away from the switch 73.

It is believed from the foregoing description of the work supporting, feeding and withdrawing carriage 18 embodying the features of this invention as applied to a welding machine, that its operation, as well as that of the machine, will be clearly apparent. However, a general description will be given.

Referring particularly to the diagrammatic representation shown in Fig. 4, the movable carriage 18 is shown in its retracted position from under the upper reciprocatory electrode 15, which is also shown in a retracted position. The parts 10 and 11 to be welded together, as shown, have been correctly assembled upon the work support 12 of the carriage. The attendant now uses both hands and presses the switches 86 which closes the circuit to energize the solenoid 87 and the movement of the core 88 thereof in the manner previously described effects a 90° clockwise rotation of the valve 78 which connects the air supply pipe 80 with the left end of the cylinder 53 and the carriage starts its advance movement and stops against the bar 67 in the position shown in Fig. 2. When the carriage 18 comes to a stop, the rollers 27 at one end are resting upon opposite ends of the yieldable pad 40 and the rollers 27 at the opposite end of the carriage are resting upon the yieldable end portions 51 of the bar 49, the carriage still being in the same horizontal plane it occupied during its advance. As the carriage 18 reaches its advanced position with the work aligned with the electrode 15, the switch actuator 75 carried by the carriage closes the switch 73 controlling the circuit to the motor 93. The operation of the motor 93 causes the upper reciprocatory electrode 15 to move downwardly and also sets in motion the cam actuated timing switch 94.

After the ram electrode 15 in its downward movement contacts the part 11 resting upon the part 10 and continues its movement a predetermined distance, the secondary winding of the transformer 100 is immediately excited by the closing of the transformer primary winding through the conductors 95 and 96 by the switch 94 and the welding of the parts 10 and 11 begins. Immediately upon the electrode 15 subjecting the parts 10 and 11 to pressure, the copper carriage platen 19 moves downwardly into engagement with the stationary copper electrode platen 22, due to the yielding of the pad 40 and end portions 51 of the bar 49, the clearance space 35 between the platens being closed up. An excellent and extended contact surface for the welding current from the platen 22 through the platen 19 and the parts 10 and 11 to the electrode 15 is thus provided. The welding current continues for a suitable period and is then interrupted by the switch 94. Upon the welding current being interrupted the electrode 15 breaks contact with the part 11 and moves upwardly. Thereafter and before the electrode 15 reaches its upper retracted position the switch 94 closes the circuit through the conductors 101 and 102 and the solenoid 92 is energized and the movement of the core 88 thereof effects a 90° rotation of the valve 78 to the position shown in Fig. 4 thereby connecting the air supply pipe 80 to the right end of the cylinder 53 and the carriage is retracted with the welded parts 10 and 11 to its unloading and loading position from under the electrode 15. Immediately upon the carriage 18 starting its movement to the position shown in Fig. 4 the circuit to the motor 93 is opened by the switch actuator 75 on the carriage being disengaged wtih the switch 73 whereupon the latter opens the motor circuit and the operating cycle of the machine is completed.

Advantages of the herein described movable work supporting, feeding and withdrawing device as applied to a machine employing a ram are that it provides safety to the attendant at the machine, is movable into and out of working position with a minimum of friction by the employment of anti-friction elements between the support and a fixed member and during the operation on the work by the ram, the ram pressure is not through the anti-friction elements, but between extended surfaces on the movable support and a fixed member. In the case of a welding machine employing such a work support, an excellent extended contact surface for the welding current is provided by the abutting extended surfaces on the movable support and fixed member instead of through the anti-friction members.

Although the invention has been disclosed and described as applied to a particular type of material working machine, namely, a welding machine, it is clear that it may have a more general application and that modifications can be made without departing from the spirit and scope of the appended claims.

What is claimed is:

1. A work support having a stationary platen, a reciprocatory platen for supporting and feeding work arranged above the stationary platen and spaced therefrom, means for maintaining said spacing during reciprocation of said platen, and a yieldable means tending to maintain said spacing when said reciprocating and stationary platens are in alignment, said yieldable means yielding during the application of pressure to the reciprocatory platen.

2. A work support having a stationary platen, a movable platen for supporting and feeding work arranged above the stationary platen and spaced therefrom, spaced anti-friction extensions on said movable platen and movable along said stationary platen, means arranged on the stationary platen along the line of movement of said extensions for maintaining said spacing during movement of said platen, and movable means onto which said extensions move when said movable platen is in a predetermined position, said movable means being movable during the application of pressure to the movable platen to close up said spacing.

3. In a material supporting device for material working machines, a movable member for supporting and carrying material into operative position for working by the machine, means for supporting and guiding said member, a stationary platen over which the member moves and having a clearance spaced from an opposed face of the platen, and yieldable elements associated with said supporting and guiding means onto which the member moves when in a predetermined position, said elements being yieldable to close up said clearance space and to carry said member to position it upon said face of the platen during the working of the material.

4. In a material supporting device for material working machines, a movable member for supporting and carrying material into position to be worked by the machine, anti-friction extensions on said member, a stationary platen having guide surfaces upon which said anti-friction extensions move, said member and platen having a normal clearance space between opposed faces thereof, and yieldable elements associated with said guide surfaces onto which the extensions move when said member is in a predetermined position, said elements being yieldable to carry said member onto the platen to close up said clearance space and cause said member to be supported upon said face of the platen during the working of the material.

5. In a material supporting device for material working machines, a movable member for supporting and carrying material into position to be worked by the machine, rollers carried by said member, a stationary platen, rails carried by said platen upon which said rollers are guided, said member and platen having a normal clearance space between opposed faces thereof, and yieldable elements along said rails onto which the rollers roll when said member is in a predetermined position, said elements being yieldable to direct the member to move to close up said clearance space and cause said member to be supported upon said face of the platen during the working of the material.

6. In a material supporting device for material working machines, an inverted U-shaped movable horizontal member for supporting and carrying material into position to be worked by the machine, rollers carried on opposite side portions of said member, a stationary horizontal platen arranged between said side portions, rails carried in recesses provided in opposite sides of said platen upon which said rollers are guided, said member and platen having a normal clearance space between upper and lower horizontal faces thereof disposed between said side portions of the member, and yieldable elements entered in apertures in said rails onto which the rollers roll when said member is in a predetermined position, said elements being yieldable for carrying the member downwardly to close up said clearance space and direct said member into engagement with the upper face of the platen during the working of the material.

7. In a welding machine including a movable pressure applying electrode, a movable platen electrode for supporting and carrying work into operative position relative to the pressure applying electrode, means for supporting and guiding said movable platen electrode, a stationary platen electrode over which the movable platen electrode moves, said platen electrodes having a normal clearance space between opposed faces thereof, and yieldable elements associated with said supporting and guiding means onto which the movable platen electrode moves when in a predetermined position, said elements serving to direct the movable platen electrode into engagement with the stationary platen to close up said clearance space and cause the movable platen electrode to be supported upon said face of the stationary platen during the welding of the work.

8. In a work supporting device for welding machines including a pressure applying electrode, a reciprocatory electrode platen for supporting and carrying work into operative position relative to the pressure applying electrode, means for supporting and guiding said reciprocatory electrode platen, a stationary platen electrode over which the reciprocatory platen moves and having a normal clearance space from an opposed face of the stationary platen, and yieldable elements carried in said supporting and guiding means onto which the reciprocatory platen electrode moves when in a predetermined position, said elements responsive when the pressure applying electrode presses upon the work to resiliently carry the reciprocatory platen electrode at an angle to its movement into predetermined position to close up said clearance space and be supported upon said face of the stationary platen electrode.

9. In a welding apparatus, a reciprocable electrode, a work supporting platen movable into alignment with said electrode, a contact platen associated with said first mentioned platen and positioned beneath it, means for supporting the first mentioned platen during its movement over the second platen, resilient means positioned to support the first mentioned platen when the work is in alignment with the electrode, said resilient means being depressible to carry the first mentioned platen into engagement with the second platen, and a welding circuit completed through the electrode, work and the two platens when the platens are in engagement.

KEITH A. WESTON.